Figure 1:
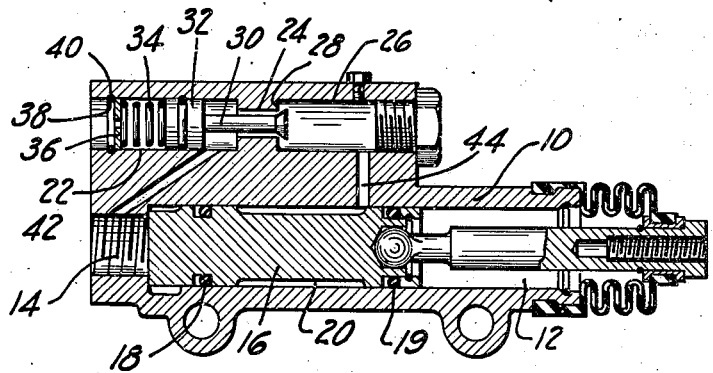

April 23, 1946.  G. W. PONTIUS, 3D  2,398,910
LUBRICATED PISTON
Filed July 22, 1944

INVENTOR
GEORGE W. PONTIUS III
BY Cecil F. Arens
ATTORNEY

Patented Apr. 23, 1946

2,398,910

UNITED STATES PATENT OFFICE 2,398,910

LUBRICATED PISTON

George W. Pontius, III, South Bend, Ind., assignor to Bendix Aviation Corporation, South Bend, Ind., a corporation of Delaware Application July 22, 1944, Serial No. 546,107

10 Claims. (Cl. 123—53)

This invention relates to automatic means for wetting a seal to prolong its life. More particularly, the invention concerns the lubrication of piston seals of the type used in hydraulic systems where high pressures are encountered.

Where a seal between moving parts, such as piston and cylinder, is lubricated only on the one side and that side is subjected to high pressure, the wear on the seal will approach a maximum due to the dry portion of the seal rubbing against a similarly dry cylinder. This excessive frictional action between a dry seal, having a high pressure applied thereto, and a similarly dry part cooperating with the seal, may be alleviated by providing an oil reservoir adapted to feed oil to the other side of the seal. This arrangement has the disadvantage, however, of necessitating close vigilance over the reservoir so that it will not become dry. Also, where a reservoir is used it is not always possible to locate the same in the most accessible place to facilitate periodic refilling. Applicant's present invention avoids all the disadvantages of the reservoir and has the advantage of maintaining both sides of a seal wet or lubricated at all times.

It is, therefore, one of the principal objects of this invention to provide means for automatically wetting one side of a seal.

Another very important object of the invention resides in the provision of means responsive to system pressure for wetting one side of a seal.

A further important object of the invention lies in the provision of means for supplying a predetermined fluid pressure to one side of a seal to prolong its life.

Another object of the invention is to provide a pressure-responsive valve for admitting fluid pressure within a predetermined pressure range to one side of a seal for lubricating the same.

A still further important object of the invention is to provide a piston with valve means therein for controlling the fluid pressure acting on one side of a seal.

Figure 2:
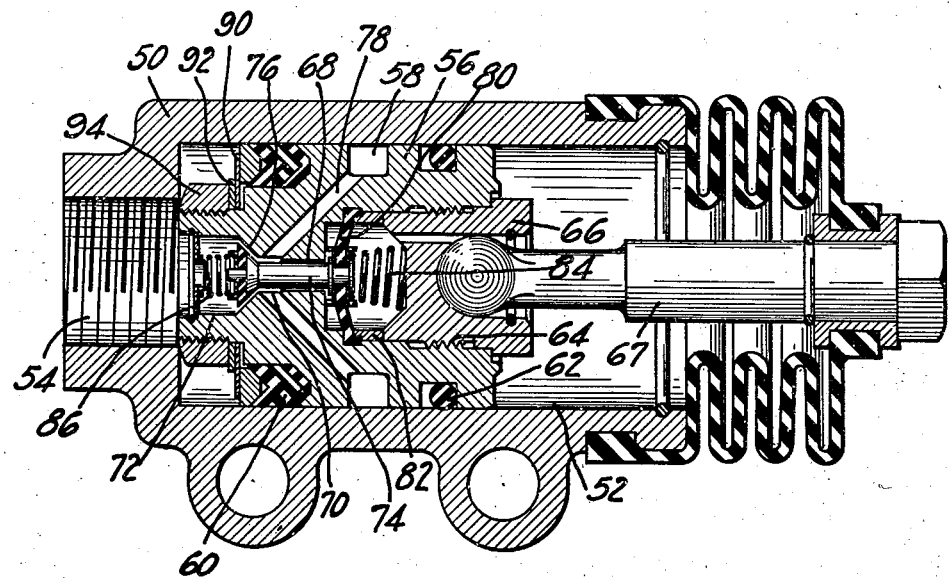

In the drawing:

Figure 1 is a sectional view in elevation of one form of the invention in which the valve means for controlling pressure is located in the cylinder housing; and Figure 2 shows a sectional view, partly in elevation, of the invention in which the valve for controlling pressure is located in a piston.

Referring now to Figure 1 of the drawing, reference numeral 10 designates generally a cylinder housing, having a cylinder 12 and a threaded connection 14 for connecting to a pressure source, not shown. A piston 16 slidably disposed in cylinder 12 has a primary seal 18 and a secondary seal 19 adjacent the ends of said piston for minimizing leakage between the cylinder wall and piston. The piston is provided with an annulated portion 20 adapted to receive fluid pressure from the connection 14 for wetting one side of each of the seals 18 and 19.

The cylinder housing 10 is bored at 22 and 24 and counterbored at 26 to form a valve seat 28 for engagement with a valve 30. Attached to valve 30 is a piston-like element 32 adapted to slide in the bore 22. A spring 34 disposed in bore 22 has one end engaging a fixed element 36 which is secured in bore 22 by a wire clip 38 which engages a recessed portion 40 of the bore 22. The other end, or free end of spring 34 contacts the element 32 to thereby urge valve 30 to open position off the valve seat 28. Passages 42 and 44 establish communication between the connection 14, which connects the hydraulic pressure source, not shown, and the annulus 20 of the piston 16.

When hydraulic pressure is admitted to connection 14 pressure acts on the left end of piston 16 and in the annulus 20 through passage 42, bore 24 and passage 44. The pressure in passage 42 also acts on the right end of piston-like element 32 closing valve 30 after the pressure has reached a predetermined value. This arrangement provides a means for obtaining low pressure fluid in the annulus 20 for wetting one side of each of seals 18 and 19, notwithstanding a high pressure in connection 14 acting on one end of the piston 16 and on the opposite side of the primary seal 18. Wetting the primary seal on both sides minimizes friction between seal and cylinder and prolongs the life of the seal. The secondary seal 19 is wetted on the one side only, but since the seal is subjected to low pressure the stroking life of the seal will be high.

In Figure 2, reference numeral 50 designates a cylinder housing having a cylinder 52 and a connection 54 for connecting a hydraulic pressure source, not shown. A piston 56, having an annulated portion 58, a primary seal 60 and a secondary seal 62, is slidably located in the cylinder 52. The piston is bored and threaded at 64 for engagement with an adaptor 66 which connects a piston rod 67. Bores 68, 70 and 72 are adapted to receive a valve 74 which seats at 76 to thereby control communication between the left end of piston 56 and the annulated portion 58 through passages 78. The valve 74 is carried by a pressure-responsive flexible wall-like member 80 which is secured in bore 64 by a ring-like element 82 which is urged against said flexible wall by the adaptor 66. The valve is normally held in open position off its seat 76 and is acted upon by a pair of springs 84 and 86, the former of which is preselected with respect to the hydraulic pressure at the connection 54 at which it is desired the valve 74 shall unseat to connect the annulus 58 with the end of the piston adjacent the connection to the source, not shown; the latter of which helps to maintain valve 74 centrally positioned in the bore 68 which is slightly larger in diameter than the valve 74 so as to permit free flow of fluid to the left side of pressure-responsive flexible member 80.

The primary seal 60 is securely held in place by washers 90 and 92 the former of which is urged against the seal by a lock nut 94 which threadedly engages the end of piston 56.

Fluid pressure admitted to the left end of piston 56 will be communicated to the annular portion 58 through bores 70 and 72 and passage 78, and to the left side of the pressure-responsive member 80 through bores 68, 70 and 72. The fluid pressure in the annular portion and on the left side of member 80 will continue to rise until a predetermined pressure for which spring 84 was chosen has forced the pressure-responsive member to yield to the right to thereby carry with it valve 74 which seats at 76 to cut off the fluid pressure from the source to the annulus 58 and to the left side of member 80. At this time, that is, with valve 74 seated, fluid pressure at a predetermined low value with respect to the pressure from the source, is trapped in the annulus for lubricating the seals 60 and 62 during piston movement. As soon as the fluid pressure acting on pressure-responsive member 80 and valve 74 has fallen to a predetermined low limit, spring 84 will move valve 74 to the left off its seat to once again establish communication between the left end of piston 56 and the annulus 58. However, should the fluid pressure on the left end of piston 56 again rise above a predetermined value the valve 74 will move onto seat 76 to cut off the high pressure fluid from the annulus which supplies lubricant to the seals. The valve may be designed to maintain, for example, a maximum fluid pressure of 15 pounds p. s. i. in the annulus for lubricating one side of the primary seal as compared with several hundred pounds pressure p. s. i. acting on the end of the piston and the other side of the primary seal. Obviously, where such a comparatively low pressure is utilized for wetting one side of the primary and secondary seals a minimum of wear on the seals may be expected.

What I claim is:

1. A mechanism for wetting the sides of a sealing means associated with a cylinder and piston assembly, comprising a valve normally spring urged to open position and constructed and arranged to respond to pressure in one end of said cylinder for controlling communication between said one end of said cylinder and the sides of said sealing means, whereby said sealing means is pressure wetted on said sides to a predetermined maximum pressure with respect to the pressure in said one end of said cylinder.

2. In combination with a piston and cylinder assembly adapted for use in a hydraulic system, a connection in one end of said cylinder for connecting a hydraulic source, an annulated portion associated with said piston for receiving hydraulic fluid from said source, sealing means for said piston, and valve means for controlling hydraulic fluid from said source to said annulated portion, whereby said sealing means is lubricated.

3. In a device of the class described having a cylinder with a piston therein, sealing means for said piston, an annulated portion associated with said piston for receiving lubrication for said sealing means, a passage connecting one end of said piston to said annulated portion, for supplying lubricant to said annulated portion, and a valve member in the passage for controlling pressure in said annulated portion.

4. In a device of the class described having a cylinder with a piston therein, sealing means for said piston, an annulated portion associated with said piston for receiving fluid pressure for wetting one side of said sealing means, a passage in said cylinder connecting one end of said piston to said annulated portion, and automatic means controlling said passage for predetermining the fluid pressure in said annulated portion.

5. In combination with a piston having sealing means associated therewith, an annulus in said piston having a passage connected to one end of said piston, and pressure-responsive means in said piston for controlling said passage connecting said annulus.

6. In combination with a piston having an annulated portion intermediately disposed between its ends for receiving fluid pressure, sealing means adjacent the ends of said piston, a passage connecting said annulated portion to one end of said piston, a valve in said piston for controlling said passage, said valve being normally spring opened and responsive to pressure for limiting the fluid pressure acting in said annulated portion.

7. In combination with a piston having an annulated portion intermediately disposed between its ends for receiving fluid pressure, sealing means adjacent the ends of said piston, passages connecting said annulated portion to one end of said piston, a pressure-responsive flexible wall-like member in said piston, a valve carried by said flexible wall-like member constructed and arranged to control the passages connecting said annulated portion, a pair of springs acting on the ends of said valve in opposing relationship, said valve being held in a normally open position to allow fluid pressure to act on said wall-like member, whereby fluid pressure in the annulated portion will be controlled.

8. In a fluid pressure actuated piston assembly, a sealing ring normally subjected on one side to fluid pressure from a source, and means for automatically pressure wetting within a predetermined pressure range the other side of said ring and including a passage for communicating fluid from said source to said other side of the sealing ring.

9. A mechanism for wetting the sides of a sealing means associated with a cylinder and piston assembly, comprising a passage connecting one end of the piston to the sides of said sealing means, a valve in the passage normally spring urged toward open position and constructed and arranged to close the passage in response to a predetermined maximum pressure acting on said one end of the piston, and to open the passage in response to a predetermined minimum pressure acting in said passage between said valve and the sides of the sealing means, whereby the latter is wetted within a preselected pressure range.

10. In combination with a cylinder and piston assembly including sealing means therebetween, a chamber for fluid in said piston in communication with the periphery thereof to transfer fluid to one side of the sealing means to wet the same, a passage connecting one end of the piston to the chamber for transmitting fluid under pressure from said one end of the piston to the chamber, and pressure-responsive means in the passage for predetermining the maximum pressure to which fluid in the chamber will be subjected.

GEORGE W. PONTIUS, III.